March 21, 1967 SHOGO SAEKI ET AL 3,310,116
MARINE PROPELLER
Filed Feb. 16, 1966
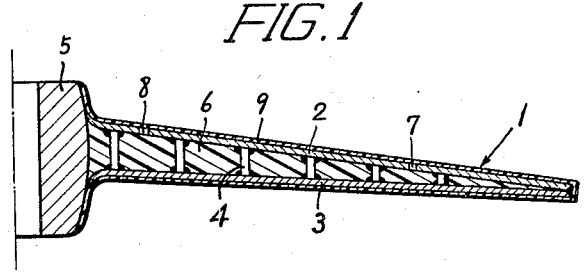
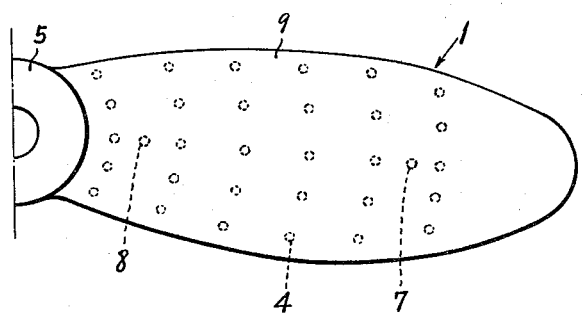
INVENTORS:
SHOGO SAEKI
HIROJI MATSUMOTO
BY Howson & Howson
ATTYS.

3,310,116
MARINE PROPELLER
Shogo Saeki, Tamano, Okayama, and Hiroji Matsumoto, Nishinomiya, Hyogo, Japan, assignors to Mitsui Shipbuilding and Engineering Co., Ltd., Tokyo, Japan, a corporation of Japan
Filed Feb. 16, 1966, Ser. No. 527,799
3 Claims. (Cl. 170—159)

This invention relates to a marine propeller.

It will be seen to be advantageous to construct the propeller blade of shell plate and to make the blade hollow in order to lessen the weight of the propeller, and it is obvious that the more the thickness of the shell plate decreases, the more the weight of the propeller decreases. However, such hollow blade has not sufficient strength, and if water penetrates into one of the blades through pinholes, the blade becomes heavier and the propeller will lose its balance and inner members will be corroded.

Accordingly, an object of the present invention is to provide a marine propeller of light weight, but sufficient strength for propelling.

Another object of the present invention is to provide a marine propeller having a member arresting the penetration of water into the hollow blades.

In accordance with this invention, the marine propeller comprises hollow blades which are filled with cellular material between the shell plates.

These and other objects are hereinafter more fully set forth and described with reference to the accompanying drawings, in which:

FIG. 1 is a vertical sectional view showing a part of a marine propeller in accordance with the present invention, and FIG. 2 is a front view of the marine propeller of FIG. 1.

In the drawings, a blade 1 of the propeller mainly comprises a hollow shell which is formed by front and back shell plates 2 and 3 of anticorrosion metal such as copper alloy or stainless steel. The plates 2 and 3 are conformed to the desired blade form on the front and back sides by any conventional plate working method.

Between the plates 2 and 3, many stiffening rods 4 are welded at their opposite ends to the both plates. The plates 2 and 3 are welded to each other about their peripheral edges. The hollow blades manufactured in the above manner are welded at their root end onto the periphery of a hub 5.

The hollow blade 1 is filled with stuffing composition 6 of cellular synthetic resin in order to arrest the penetration of water.

The method of putting the synthetic resin into the hollow blade 1 is as follows. In the plate 2 are provided an inlet opening 7 for pouring a liquid synthetic resin and a vent port 8. The propeller is supported in the posture shown in FIG. 1, with the vent port 8 positioned higher than the inlet opening 7. A liquid synthetic resin and a foaming agent are poured into the hollow blade 1 through the inlet opening 7. If the polyurethane resin is used for the cellular synthetic resin, the method may be simplified. That is, polyether and isocyanate which are the ingredients of the polyurethane resin are mixed in the ratio of one to one and poured with a catalyzer into the hollow blade 1 through the inlet opening 7. Both materials react with each other in the blade, and after about ten minutes, they cure to form the cellular polyurethane. Then, the opening 7 and port 8 are sealed by welding or by filling them with a thermosetting resin such as epoxy resin. Further, the blade 1 is coated by synthetic resin film 9 such as nylon or polycarbonate.

In accordance with the present invention, the sandwich structure comprising the shell and the other material accomplishes an increase in the strength against bending to prevent deflection of the tip portion of the blade.

Even if water penetrates into the blade through pinholes, the penetration of additional water is arrested by the cellular synthetic resin, and the propeller does not lose its balance owing to the water.

While a particular embodiment of the present invention has been illustrated and described herein, it is not intended to limit the invention to such a disclosure, and changes and modifications may be incorporated and embodied therein within the scope of the following claims.

We claim:

1. A marine propeller comprising a hub and hollow blades mounted about the periphery of said hub, said hollow blades comprising a pair of plates conforming in outline to each other and formed to the desired blade form on the front and back sides, said plates being interconnected about their periphery to form a hollow blade structure, stiffening rods spanning between said plates, an inlet opening in said blade, a vent port in said blade spaced from said inlet opening, a cellular stuffing composition formed in place in said hollow blade by introduction of the ingredients thereof through said inlet opening, and means to seal said inlet opening and vent port including a synthetic resin film coating said blade.

2. A marine propeller according to claim 1 wherein said cellular stuffing composition comprises a polyurethane resin adapted to arrest penetration of water into the hollow blade.

3. A marine propeller according to claim 1 wherein said plates are composed of anticorrosion metal formed in the desired shape by plate working.

References Cited by the Examiner

UNITED STATES PATENTS

| 2,767,461 | 10/1956 | Lebold et al. | 170—159 X |
| 3,055,437 | 9/1962 | Stack | 170—159 |
| 3,112,797 | 12/1963 | Haw | 170—159 |
| 3,133,596 | 5/1964 | Berliner | 170—159 |

FOREIGN PATENTS

| 603,100 | 1/1926 | France. |
| 894,447 | 3/1944 | France. |
| 124,253 | 3/1919 | Great Britain. |
| 659,344 | 10/1951 | Great Britain. |

MARTIN P. SCHWADRON, Primary Examiner.

EVERETTE A. POWELL, Jr., Assistant Examiner.